(12) United States Patent
Jeoung et al.

(10) Patent No.: US 9,678,418 B2
(45) Date of Patent: Jun. 13, 2017

(54) LIGHT SOURCE UNIT

(71) Applicant: LG ELECTRONICS INC., Seoul (KR)

(72) Inventors: Byungwoo Jeoung, Seoul (KR); Yongwoo Bae, Seoul (KR); Kihyuk Song, Seoul (KR); Sangok Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 14/648,141

(22) PCT Filed: Sep. 24, 2013

(86) PCT No.: PCT/KR2013/008547
§ 371 (c)(1),
(2) Date: May 28, 2015

(87) PCT Pub. No.: WO2014/084489
PCT Pub. Date: Jun. 5, 2014

(65) Prior Publication Data
US 2015/0316839 A1 Nov. 5, 2015

(30) Foreign Application Priority Data

Nov. 29, 2012 (KR) ......................... 10-2012-0137228

(51) Int. Cl.
*G03B 21/20* (2006.01)
*G02B 27/28* (2006.01)
*G02B 5/30* (2006.01)
*G02B 26/00* (2006.01)
*G03B 21/16* (2006.01)
(Continued)

(52) U.S. Cl.
CPC ......... *G03B 21/204* (2013.01); *G02B 5/3083* (2013.01); *G02B 26/008* (2013.01); *G02B 27/283* (2013.01); *G03B 21/16* (2013.01); *G03B 21/2073* (2013.01); *G03B 33/08* (2013.01);
(Continued)

(58) Field of Classification Search
CPC .................................................... G03B 21/204
See application file for complete search history.

(56) References Cited

U.S. PATENT DOCUMENTS 8,562,146 B2* 10/2013 Kitano ................. G03B 21/204
353/31
8,690,343 B2* 4/2014 Tanaka ............... G03B 21/2013
348/743
(Continued)

FOREIGN PATENT DOCUMENTS

JP 2012-181312 A 9/2012
JP 2012-198265 A 10/2012
KR 10-2005-0028393 A 3/2005

*Primary Examiner* — Bao-Luan Le
(74) *Attorney, Agent, or Firm* — Birch, Stewart, Kolasch & Birch, LLP (57) ABSTRACT

A light source unit includes a light source which emits a light bundle in one direction; a polarizing unit which is formed to selectively transmit a certain polarized light of a certain wavelength in the light bundle; and a reflection unit which is formed so as to delay the phase of the polarized light so that the polarized light is reflected by the polarizing unit, convert one part of the wavelength of the polarized light, and reflect the polarized light toward the polarizing unit.

20 Claims, 10 Drawing Sheets

(51) Int. Cl.
  *G03B 33/08* (2006.01)
  *H04N 9/31* (2006.01)
(52) U.S. Cl.
  CPC ......... *H04N 9/3114* (2013.01); *H04N 9/3158* (2013.01); *H04N 9/3167* (2013.01)

(56) References Cited

U.S. PATENT DOCUMENTS

| | | | | |
|---|---|---|---|---|
| 8,733,940 B2* | 5/2014 | Tanaka | .................... | G03B 21/28 353/20 |
| 8,820,940 B2* | 9/2014 | Kita | ..................... | G03B 21/204 353/84 |
| 8,840,253 B2* | 9/2014 | Kitano | ................. | H04N 9/3111 348/339 |
| 8,894,241 B2* | 11/2014 | Kitano | ................. | H04N 9/3114 345/208 |
| 8,915,597 B2* | 12/2014 | Kitano | ................. | H04N 9/3105 353/94 |
| 8,926,098 B2* | 1/2015 | Yang | .................... | G03B 21/204 353/31 |
| 9,170,423 B2* | 10/2015 | Mehl | ...................... | F21V 13/02 |
| 9,170,475 B2* | 10/2015 | Maes | ................... | G03B 21/204 |
| 9,195,123 B2* | 11/2015 | Pettitt | .................. | G03B 21/204 |
| 2005/0063184 A1 | 3/2005 | Lee et al. | | |
| 2009/0034284 A1 | 2/2009 | Li et al. | | |
| 2009/0039375 A1 | 2/2009 | LeToquin et al. | | |
| 2011/0310363 A1* | 12/2011 | Kita | ..................... | G03B 21/204 353/98 |
| 2012/0081674 A1* | 4/2012 | Okuda | ................. | G03B 21/204 353/20 |
| 2012/0127435 A1* | 5/2012 | Kitano | ................. | G03B 21/204 353/20 |
| 2012/0133903 A1* | 5/2012 | Tanaka | ............... | G03B 21/2013 353/31 |
| 2012/0140183 A1* | 6/2012 | Tanaka | .................. | G03B 21/28 353/20 |
| 2012/0242912 A1* | 9/2012 | Kitano | ................. | H04N 9/3111 348/759 |
| 2012/0268917 A1* | 10/2012 | Kitano | ................. | H04N 9/3105 362/84 |
| 2013/0088471 A1* | 4/2013 | Kitano | ................. | H04N 9/3114 345/208 |
| 2013/0100417 A1* | 4/2013 | Yang | .................... | G03B 21/204 353/31 |
| 2013/0107226 A1* | 5/2013 | Aksenov | ................ | H04N 9/315 353/31 |
| 2013/0242534 A1* | 9/2013 | Pettitt | .................. | G03B 21/204 362/84 |
| 2014/0016297 A1* | 1/2014 | Mehl | ...................... | F21V 13/02 362/19 |
| 2014/0240676 A1* | 8/2014 | Maes | ................... | G03B 21/204 353/20 |
| 2014/0328044 A1* | 11/2014 | Mehl | .................... | G03B 21/204 362/19 |
| 2016/0062221 A1* | 3/2016 | Matsubara | ......... | G03B 21/2013 353/31 |
| 2016/0077417 A1* | 3/2016 | Ishikawa | ............ | G03B 21/2013 353/20 |

\* cited by examiner

LIGHT SOURCE UNIT

BACKGROUND OF THE INVENTION

1. Technical Field

The present invention relates to an image projection device that outputs an image and a method of controlling the image projection device.

2. Background Art

With technical advances in the formation age, particular emphasis is placed on the importance of a display apparatus realizing a large-sized screen. As one example of the apparatus realizing the large-scale screen, there is a projector equipped with a function of enlarging an image.

In recent years, the focus has been on the performance of the projector, and various attempts are made to improve the performance of the projector in software. As one example, an attempt has been made to realize a projector that uses a light source, such as a laser diode (LD), a light emitting diode (LED), an organic EL (OLED), or a fluorescent material.

For example, when a voltage is applied to both ends of the laser diode, the laser diode emits a coherent light, that is a laser, which has a constant wavelength through stimulated emission and enhanced interference. The laser that is emitted from each of the multiple laser diodes is condensed through a lens and serves as a high-brightness light source.

Generally, a light source unit emits a light with various colors using a blue light. However, a propagation path for the blue light is necessary to obtain the blue light, and thus a space for forming a propagation path for the blue light has to be secured within the light source unit.

SUMMARY OF THE INVENTION

Therefore, an object of the present invention is to provide a more compact light source unit.

To achieve these and other advantages and in accordance with the purpose of the present invention, as embodied and broadly described herein, there is provided a light source unit that includes a light source, a polarization unit, and a reflection unit. The light source emits a pencil of rays in one direction. The polarization unit is configured to selectively transmit a specific polarization light with a specific wavelength in the pencil of rays. The reflection unit is configured to retard a phase of the polarization light and to convert a wavelength of one portion of the polarization light in such a manner that the polarization light is reflected by the polarization unit, and to reflect the polarization light toward the polarization unit.

According to one embodiment of the present invention, the polarization unit may be configured to transmit a P wave blue light in the pencil of rays.

According to one embodiment of the present invention the reflection unit may include a phase retardation layer that is configured to retard a phase of the blue light in such a manner that the P wave blue light emitted from the polarization unit is converted into an S wave blue light.

According to one embodiment of the present invention, the phase retardation layer may be configured to retard a phase of the blue light by $\lambda/4$. According to one embodiment of the present invention, the reflection unit may further include a wavelength conversion wheel that includes a fluorescent region which includes a fluorescent material that converts the wavelength of the blue light.

According to one embodiment of the present invention, the wavelength conversion wheel may be sectioned based on a predetermined central angle to form a fluorescent region and a reflective region, the fluorescent region may include different fluorescent materials that convert the blue light into different wavelengths, and the reflective region may reflect the blue light.

According to one embodiment of the present invention, the wavelength conversion wheel may include a circle-shaped that is made of a metal material to reflect light, the fluorescent region that is formed along an edge of the base in such a manner as to have the shape of a closed loop and that includes at least one fluorescent material to convert the wavelength of the blue light, and the reflective region that is formed adjacent to the fluorescent region in such a manner as to have the shape of a closed loop along the edge and that reflects the blue light.

According to one embodiment of the present invention, the wavelength conversion wheel may include a circle-shaped base that is made of a metal material to reflect light, and at least one a fluorescent layer that is formed on one surface of the base along an edge of the base to a predetermined width in such a manner as to have the shape of a closed loop, and that includes at least one or more fluorescent materials that are superimposed onto one another.

According to one embodiment of the present invention, the wavelength conversion wheel may further include a heat sink that is formed to protrude from the other surface of the base in order to dissipate heat.

According to one embodiment of the present invention, the wavelength conversion wheel may include the circle-shaped base that is made of the metal material to reflect the light, and the fluorescent layer that is formed on one surface of the base along an edge of the base to a predetermined width in such a manner as to have the shape of a closed loop, and that converts the wavelength of the blue light into at least one wavelength, in which the fluorescent layer may be mixed with at least one fluorescent material that changes the wavelength of the blue light.

According to one embodiment of the present invention may further include a color wheel that is configured to be partitioned into segments with multiple colors and to rotate about the center of the color wheel in such a manner that the pencil of rays that is reflected by the polarization beam splitting film is incident on the color wheel and is light-split into the multiple colors, in which the color wheel may be driven in such a manner a rotation speed of the color wheel is the same as a rotation speed of the wavelength conversion wheel.

To achieve these and other advantages and in accordance with the purpose of the present invention, as embodied and broadly described herein, there is provided an image projection device including a body that makes up an external appearance; a light source unit that is arranged within the body and that emits a pencil of rays that includes at least one color; and an image formation unit that forms an image using the pencil of rays.

In the image projection device, the light source unit may include a light source that emits a pencil of rays in one direction, a polarization unit that is configured to selectively transmit a polarization light with a specific wavelength in the pencil of rays; and a reflection unit that retards a phase of the polarization light and converts a wavelength of one portion of the polarization light in such a manner that the polarization light is reflected by the polarization unit, and that reflects the polarization light toward the polarization unit.

To achieve these and other advantages and in accordance with the purpose of the present invention, as embodied and broadly described herein, there is provided a light source unit including: a wavelength conversion wheel that converts one portion of a blue light with a first phase, and converts wavelengths of the rest of the blue light; a phase retardation film that changes the first phase of the emitted light into a second phase; and a polarization beam splitting film that is configured to reflect to the second phase.

According to one example of the present invention, the light source unit may further include a light source that provides the polarization beam splitting film with the blue light that has a third phase which is retarded by λ/2 from the second phase.

According to the present invention, a blue light and wavelengths of the multiple lights are generated along substantially the same propagation path by utilizing a specific polarization component of the blue light as a light source through the use of a polarization beam splitting film that including a reflection region which reflects the blue light and of a phase retardation film. Therefore, a construction for forming a propagation path for the blue light is unnecessary, and thus a construction of a light source unit is simplified.

DETAILED DESCRIPTION OF THE EMBODIMENTS

Reference will now be made in detail to the preferred embodiments of the present invention, examples of which are illustrated in the accompanying drawings.

Figure 1:
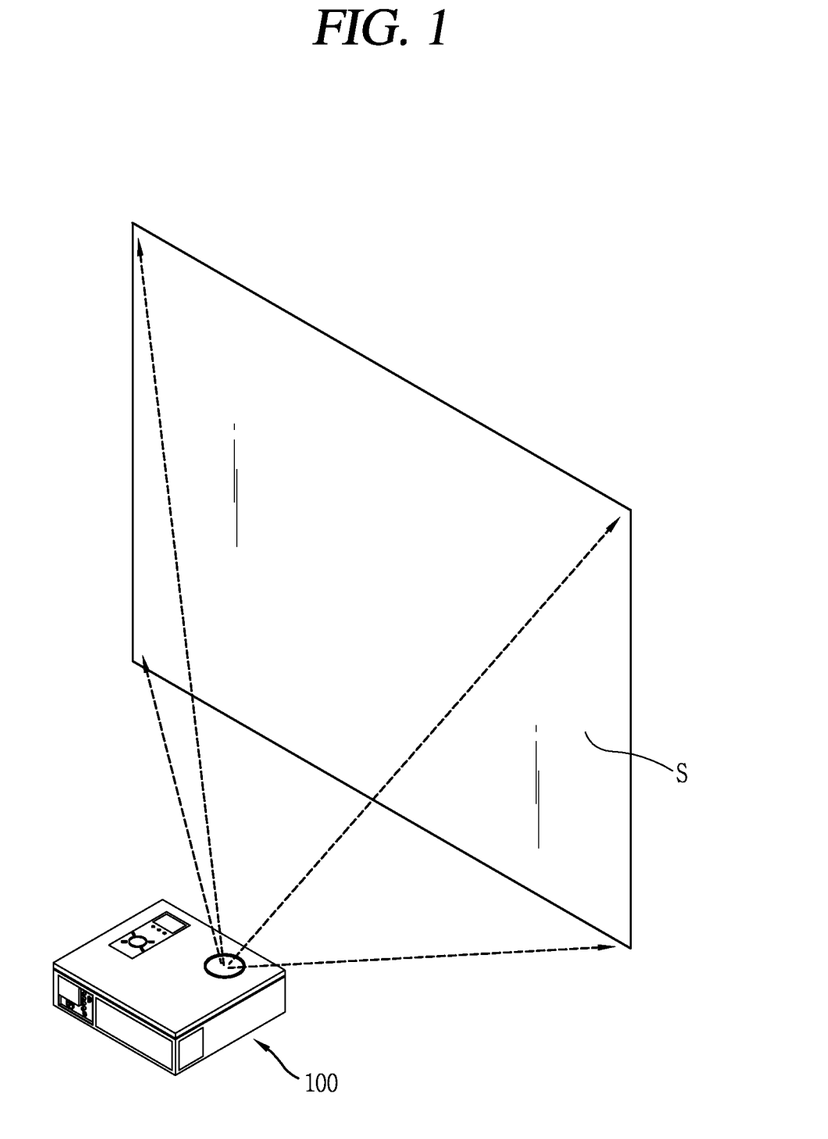
FIG. 1 is a diagram illustrating operation of an image projection device according to one embodiment of the present invention.

FIG. 1 is a diagram illustrating operation of an image projection device according to one embodiment of the present invention.

An image projection device 100 according to the present invention projects a large-scaled image onto a screen S that is positioned a very short distance away from the image projection device 100.

The image projection device 100 is an apparatus that realizes an image using light emitted from a light source, and projects the realized image. As the image projection device 100, for example, there is a projector that enlarges and projects an image as illustrated. As one example of the image projection device 100 according to the present invention, the projector will be described below. However, the image projection device 100 is not limited to this and may be applied to, for example, a projection apparatus that is built into a projection television set and the like. As an example, the projector is described in the present specification.

As illustrated, the image projection device 100 is positioned in front of the screen S but below (above) the screen 3, in such a manner that a large-scaled image is projected onto the screen S.

Figure 2A:
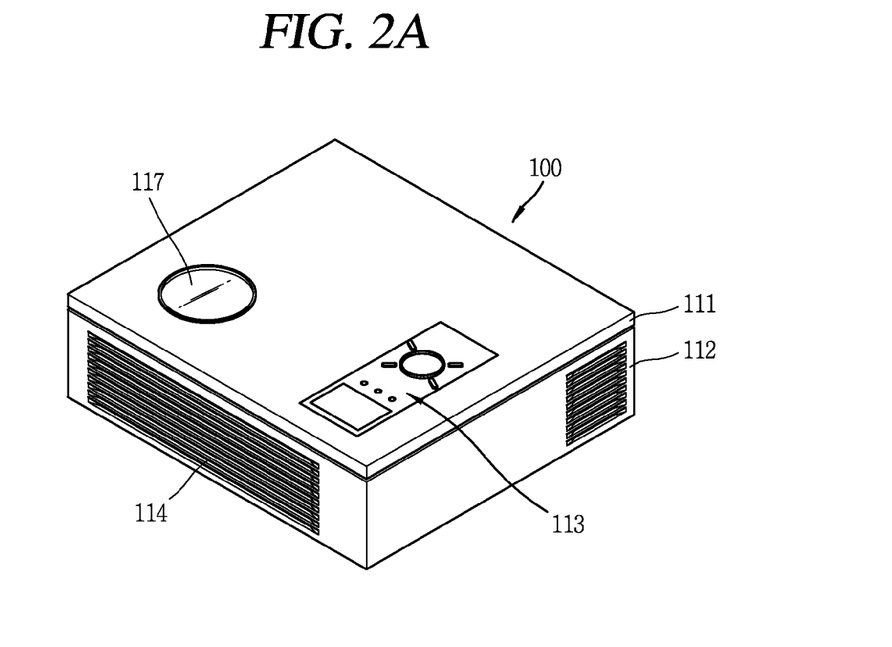
FIGS. 2A and 2B are perspective diagrams of the image projection device in FIG. 1 when viewed from in front of and in rear of the image projection device, respectively.
Figure 2B:
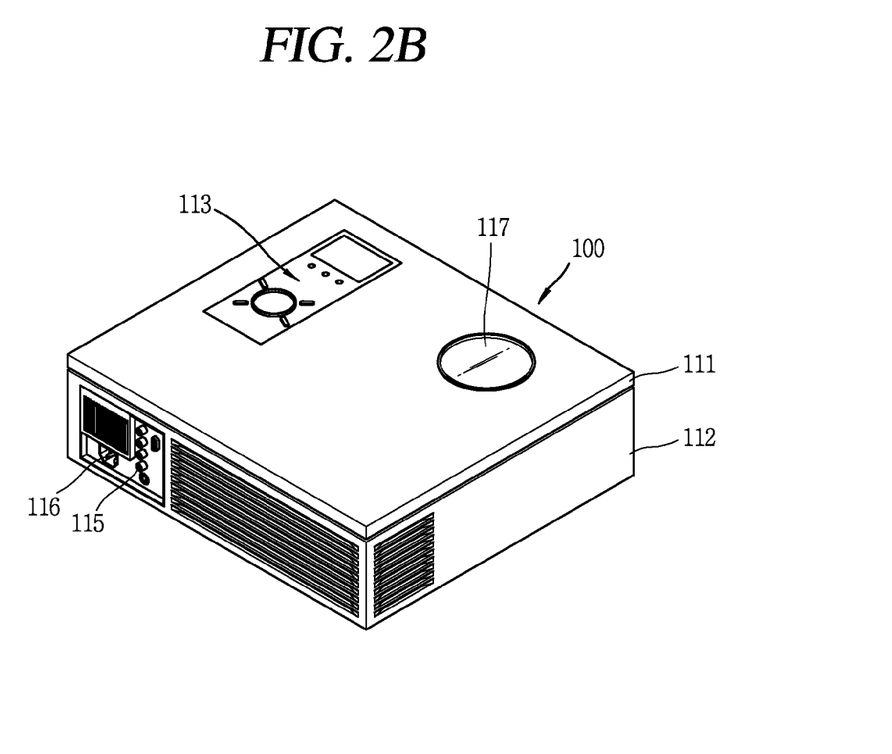

The image projection device 100 will be described below. FIGS. 2A and 2B are perspective diagrams of the image projection device 100 in FIG. 1 when viewed from in front of and in rear of the image projection device 100, respectively.

Constituent elements illustrated in FIGS. 2A and 2B are not necessarily indispensable. The image projection device 100 may include only one or more of these or may further include other constituent elements.

Referring to the drawings, upper and lower cases 111 and 112 make up the exterior appearance of the image projection device 100. Various optical components and electronic components are accommodated in a space that is formed by the upper and lower cases 111 and 112. At least one or more middle cases may be arranged between the upper and lower cases 111 and 112.

An operation unit 113 is arranged in the upper case 111. Any tactile manner that gives a user a tactile feeling when operating the operation unit 113 may be employed.

Input into the operation unit 113 are commands for controlling the operation of the image projection device 100. In terms of functionality, the operation unit 113 is used for inputting a start command, an end command, or the like on an operation menu.

In addition, the operation unit is operated for zooming-in or zooming-out on an image that is projected from the image projection device 100. The operation unit 113 is operated for an image projected from the image projection device 100 to remain in focus.

An air flow unit 112, an interface 115, and a power supply 116 are arranged in the lower case 112.

The air flow unit 114 is configured to have multiple through holes through which outside air is introduced into the image projection device 100. Thus, by convection, the image projection device 100 is air-cooled.

The interface 115 provides a connection to an external apparatus for data exchange. External image data that corresponds to an image which is projected from the image projection device 100 is input through the interface 115. Referring to the drawings, the interface 115 includes terminals that are electrically connected to electronic apparatuses that can supply image or sound data, such as a computer and a DVD player.

The power supply 116 that supplies power to the image projection device 100 is mounted in the lower case 112. The power supply 116 is configured to convert alternating current, which is supplied for home use, into direct current. However, the configuration of the power supply 116 is not limited to this, and may be a rechargeable battery that is removably attached.

A sound output unit in the form of a speaker is provided in either of the upper and lower cases 111 and 112. For example, an antenna for receiving broadcast signals may additionally be either of the upper and lower cases 111 and 112.

As illustrated, a projection unit 117 is configured to project an image from an upper surface of the upper case 111 to the outside. The projection unit 117 includes a projection system 140 (or an optical system) (refer to FIG. 3) in which multiple lenses and mirrors are arranged given distances away from one another. With the operation of the operation unit 113, the projection unit 117 is configured to adjust distances between each of the multiple lenses and the mirrors. Thus, the image projection device 100 performs a zooming or focusing function.

The image projection device 100 includes a light source unit that emits light. The light source unit according to the present invention includes a light source that emits a blue light, and is configured in such a manner that a propagation path for the blue light is the same as the propagation paths for multiple lights that have different wavelengths from a wavelength of the blue light. A construction of the light source unit will be described in detail below.

Figure 3:
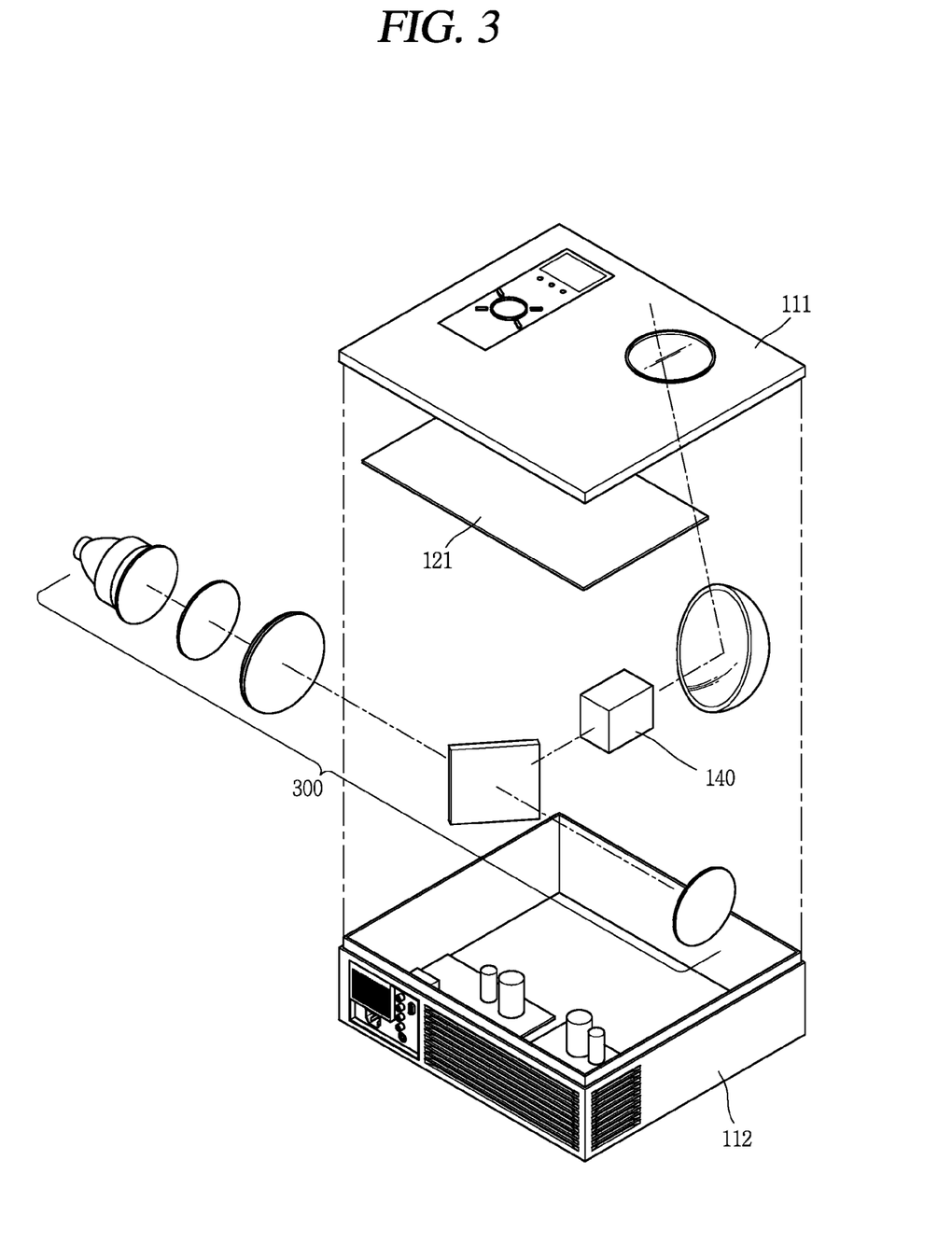
FIG. 3 is an exploded diagram illustrating the image projection device in FIG. 1.
Figure 4:
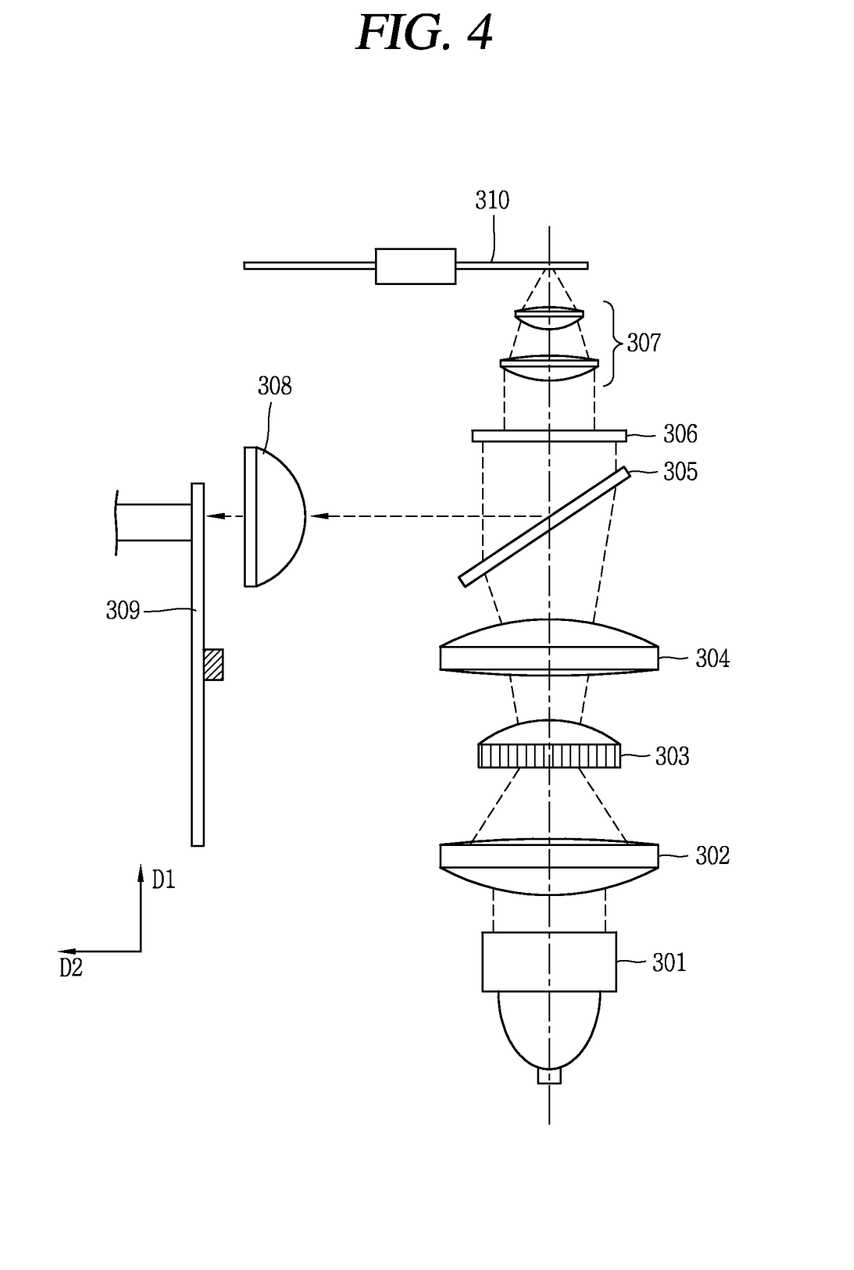
FIG. 4 is a diagram for describing a construction of a light source unit in FIG. 3.
Figure 5:
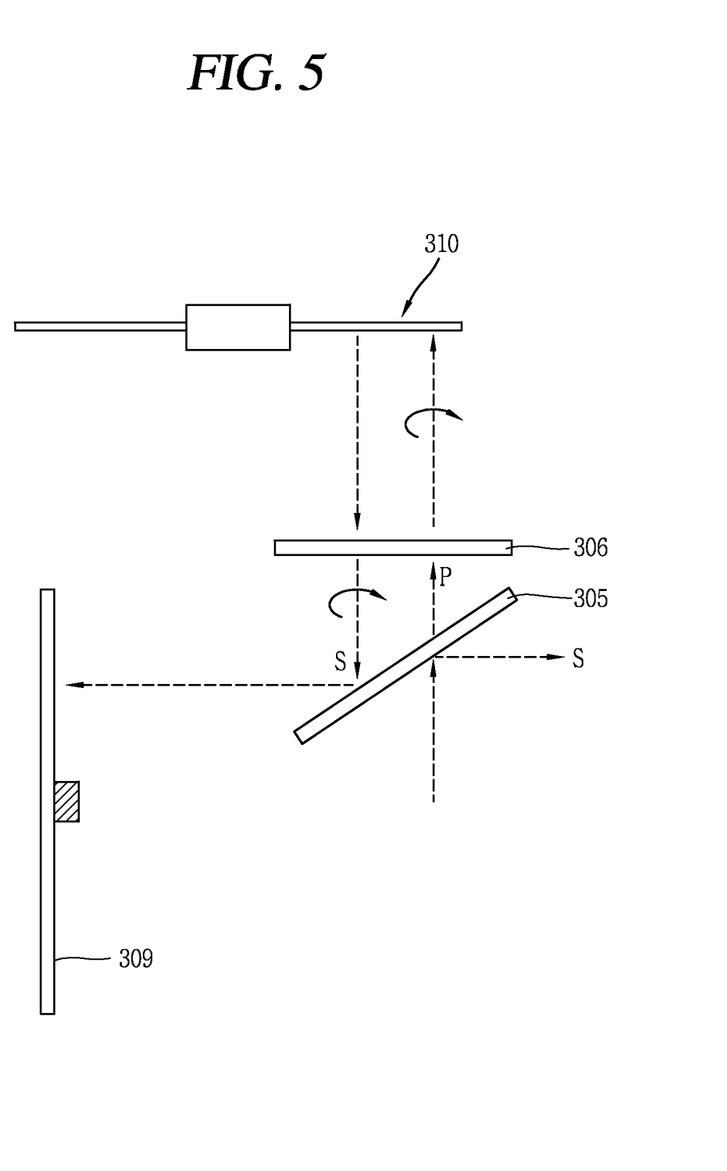
FIG. 5 is a diagram of one portion of the light source unit for describing a light propagation path.

FIG. 3 is an exploded diagram of the image projection device in FIG. 1. FIG. 4 is for a diagram for describing the construction of the light source unit in FIG. 3. FIG. 5 is a diagram of one portion of the light source unit for describing a light propagation path.

Referring to FIG. 3, the image projection device 100 includes the upper case 111, the lower case 112, a control circuit board 121, a light source unit 300, an image conversion device and a projection lens 140.

The control circuit board 121 is mounted in the lower case 112. The control circuit board 121 is configured as one example of a controller that performs various functions of the image projection device 100.

The light source unit 300 is mounted in the lower case 112. The light source unit 300 means a system that is configured from optical components for realizing an image of an object using reflection and refraction of light. A frame (not illustrated) of assemble for the light source unit 300 is additionally arranged between the light source unit 300 and the lower case 112.

The image conversion device is configured to form an image using incident light from the light source unit 300. For example, the image conversion device is an optical system that performs light conversion or light separation on generated light and performs image conversion using a display element. The image that is output from the image conversion device passes through the projection lens 140 in order to be projected onto the screen in a large-scaled manner.

The light source unit 300 is configured to form a pencil of rays using electric energy. The light source unit 300 according to the present invention will be described in detail below.

Referring to FIGS. 3 and 4, the light source unit 300 includes a light source 301, a first condensing lens 302, a Fly's Eye lens 303, a second condensing lens 304, a polarization beam splitting film 305, a phase retardation film 306, a third condensing lens 307, a wavelength conversion wheel 310, a fourth condensing lens 308, and a color wheel 309.

The light source 301 is configured in such a manner that the light source 301 is provided with electric energy, converts the electric energy into light energy, and thus generates a pencil of rays. The light source 301 is configured from LEDs, OLEDs, or fluorescent materials. The light source 301 according to the embodiment of the present invention is configured from multiple laser diodes (LD). The light source 301 according to the present invention is configured from an LD array of multiple high-power blue laser diodes.

A blue light emitted from the light source 301 passes through various types of lens in order to be condensed and be uniformly distributed. The lenses that the blue light passes through include the first condensing lens 302, the Fly's Eye lens 303 and the second condensing lens 304.

The condensing lens plays a role of focusing a pencil of rays onto a desired point in a desired direction. The Fly's Eye lens is configured from a small lens that has a rectangular surface and a direction of a longer side of the small lens corresponds to direction in which a light emitting unit focuses a pencil of rays.

The blue light that passes through the first condensing lens 302, the Fly's Eye lens 303, and the second condensing lens 304 reaches a polarization unit. The polarization unit is configured from the polarization beam splitting film 305. The polarization beam splitting film (PBF) 305 is an optical system that selectively reflects or transmits only a specific polarization component of a specific wavelength.

For example, the polarization beam splitting film 305 selectively transmits a P wave in a wavelength (approximately 380 nm to approximately 480 nm) of blue light in a pencil of rays. In addition, the polarization beam splitting film 305 reflects not only red light R, green light G and yellow light Y, but also an S wave of blue light.

In this case, it is desirable that a transmission rate of a P wave of light with an approximately 420 nm to approximately 470 nm wavelength through the polarization beam splitting film 305 is approximately 90% or greater and a transmission rate of a S wave is approximately 10%. In addition, it is desirable that a transmission rate of light with an approximately 470 nm to approximately 800 nm wavelength is approximately 10% or smaller (a reflection rate is approximately 90% or greater).

Therefore, according to the present invention, because the light that passes through the polarization beam splitting film 305 is light that is finally provided, it is desirable that in order to improve efficiency, light that is emitted from the LD array is P wave blue light.

The P wave blue light that passes through the polarization beam splitting film 305 is reflected by a reflection unit and return to the polarization beam splitting film 305. The reflection unit includes the phase retardation film 306, the third condensing lens 307, and the wavelength conversion wheel 310. The P wave blue light passes through the phase retardation film 306 and the third condensing lens 307, is reflected by the wavelength conversion wheel 310, passes again through the third condensing lens 307 and the phase retardation film 306, and reaches the polarization beam splitting film 305.

The phase retardation film 306 is configured from a $\lambda/4$ wave plate that retards a phase of the P wave blue light only by $\lambda/4$ while the P wave blue light passes through the phase retardation film 306. The phase retardation film 306 retards the phase of the blue light only by $\lambda/4$. The blue light that passes through the phase retardation film 306 passes through the third condensing lens 307. The blue light condensed by the third condensing lens 307 is reflected by the wavelength conversion wheel 310.

The wavelength conversion wheel 310 includes a wave conversion material that converts a wavelength of the blue light into red R, green G, and yellow Y wavelengths. Generally, the wavelength conversion wheel 310 is in the shape of a plate that is made of a material which reflects the light, and is configured in such a manner that the wavelength conversion wheel 310 rotates about a spindle that perpendicularly pierces through the center of the plate. The blue light is incident on the wavelength conversion wheel 310 that rotates, and blue light B, red light R, green light G, and yellow light Y are reflected from the wavelength conversion wheel 310.

The wavelength conversion wheel 310 is configured to have RGBY regions, each of which a reflective mirror made of a metal material. A construction of the wavelength conversion wheel 310 according to various embodiments of the present invention will be described in detail below.

The blue light B, the red light R, the green light G, and the yellow light Y are condensed by the third condensing lens 307 and are incident on the phase retardation film 306.

Referring to FIG. 5, phases of the blue light B, the red light R, the green light G, and the yellow light Y are retarded only by λ/4 by the phase retardation film 306. However, in this case, a wavelength of each light incident on the phase retardation film 306 is not converted.

The phases of the blue light B, the red light R, the green light G, and the yellow light Y are retarded once more by λ/4 by the phase retardation film 306, and thus the blue light B, the red light R, the green light G, and the yellow light Y are polarization-converted into an S wave. The S wave blue light B, the red light R, the green light G, and the yellow light Y reach the polarization beam splitting film 305.

As described above, since the polarization beam splitting film 305 transmits only the P wave blue light, the S wave blue light B, the red light R, the green light G, and the yellow light Y are reflected by the polarization beam splitting film 305.

The polarization beam splitting film 305 is arranged in such a manner that the polarization beam splitting film 305 is inclined by a predetermined angle with respect to the phase retardation film 306. For example, the polarization beam splitting film 305 is arranged in such a manner that the polarization beam splitting film 305 is inclined by 45 degrees with respect to the phase retardation film 306. In this case, light that is incident on the polarization beam splitting film 305 along a direction opposite to a first direction D1 is reflected in a second direction D2 perpendicular to the first direction D1.

However, a direction in which the light is finally emitted from a light source device is not limited to the second direction D2. That is, the direction of the light that is finally emitted from the light source device is adjusted by adjusting an angle of the polarization beam splitting film 305.

That is, a propagation path for the blue light is changed by using the polarization beam splitting film that transmits only the specific wavelength and the specific polarization component and the retardation film that converts the polarization component.

Accordingly, the light source device according to the present invention, the blue light B that is generated in the light source propagates in the same propagation path as does the red light R and the green light G, and the yellow light Y that are regenerated from the wavelength conversion wheel 310. That is, since the blue light B, and the red light R, the green light G, and the yellow light Y propagate along the same propagation path, a separate construction for emitting the blue light B along with lights with different wavelengths is unnecessary.

Accordingly, an internal frame of the power source device is simplified and a whole size of the power source device is reduced.

The light source device may further include a fourth condensing lens 308 that condenses the blue light B, the red light R, the green light G, and the yellow light Y that propagates in the second direction D2. A pencil of rays that is condensed by the fourth condensing lens 308 is color-split by the color wheel 309 and is emitted to the outside.

The color wheel 309 is configured in such a manner that that the color wheel 309 are repeatedly partitioned into multiple segments categorized into at least the blue, the red, the green, and the yellow and rotate at high speed. In order to rotate the color wheel 309, a motor (not illustrated) is provided that is mounted on the color wheel 309.

The color wheel 309 is formed to have the shape of a disk with a predetermined diameter. A pencil of rays that is provided from the fourth condensing lens is light-split into a light of any one of red, green, blue, and yellow according to a color of the color wheel 309.

As described above, the blue light and the pencil of rays with the rest of the wavelengths propagate along the same propagation path by the wavelength conversion wheel including a reflective region and a fluorescent region. The fluorescent region is made of various types of fluorescent materials that convert the wavelength of the blue light, and the fluorescent material has various structures. A construction of the wavelength conversion wheel according to various embodiments of the present invention will be described in detail below.

Figure 6:
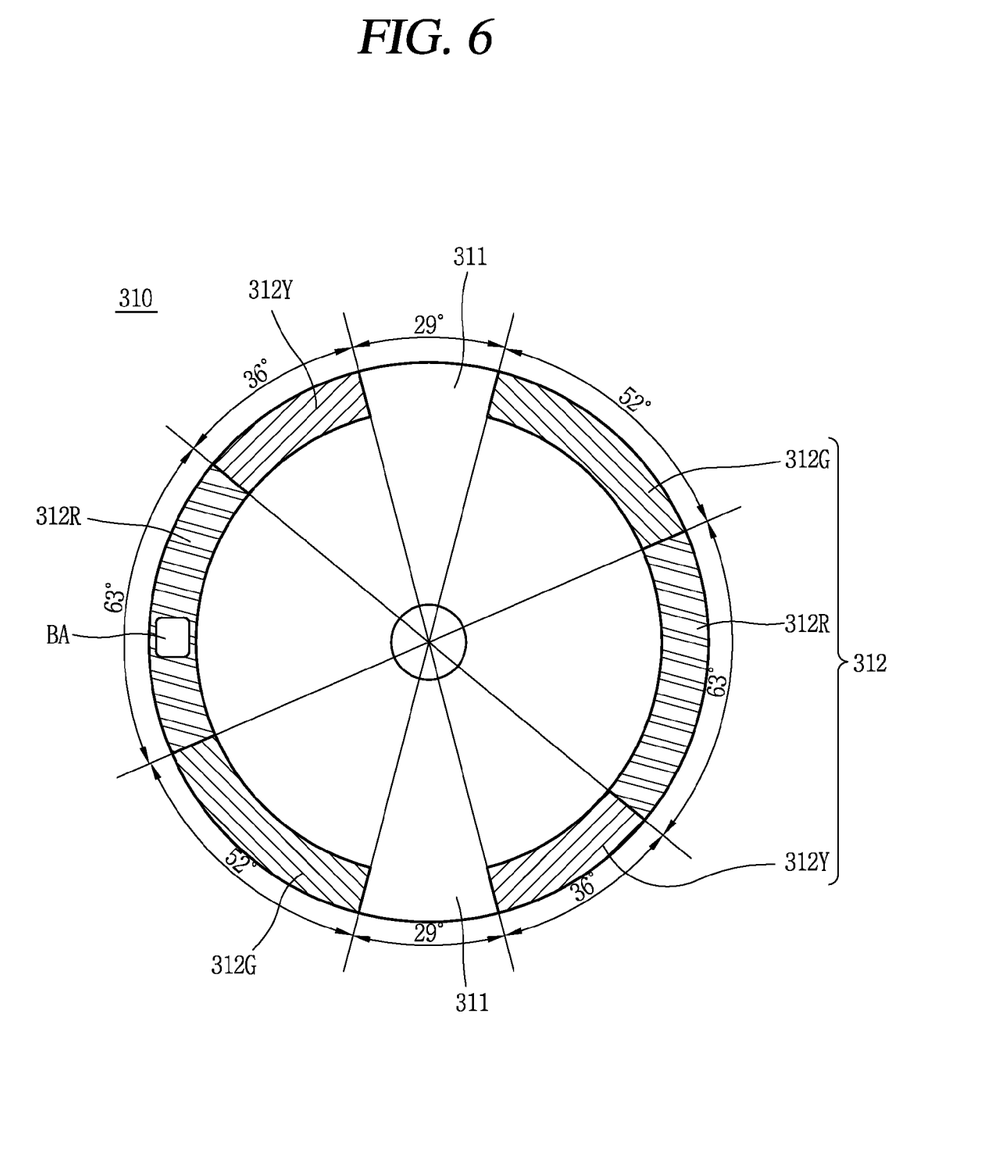
FIG. 6 is a diagram of a wavelength conversion wheel according to one embodiment.

FIG. 6 is a diagram of the wavelength conversion wheel according to one embodiment of the present invention. The wavelength conversion wheel illustrated in FIG. 6 is configured from multiple segments, in such a manner that the rotation of the wavelength conversion wheel sequentially emits lights of multiple colors.

The wavelength conversion wheel 310 is configured to have the shape of a circular plate, in such a manner that the wavelength conversion wheel 310 rotates about the spindle that extends in a direction perpendicular to the circular plate from the center of the circular plate. The wavelength conversion wheel 310 in the shape of the circular plate is made of a metal disk. Therefore, the blue light incident on the wavelength conversion wheel 310 is reflected in the opposite direction by the wavelength conversion wheel 310 in the shape of the metal disk.

The reflective region 311 includes an aluminum (Al) reflective layer. The reflective region 311 is configured in such a manner that the reflective region 311 reflects the blue light in order for the blue light being propagated to the wavelength conversion wheel 310. The wavelength and phase of the blue light do not change while the blue light is reflected by the reflective region 311. That is, only a propagation path for the blue light changes by the reflective region 311.

The reflective region 311 is configured to be integrated with a central portion of the circle-shaped disk that extends from the center of the center of the wavelength conversion wheel 310. That is, the whole disk is made of an aluminum material.

The reflective region 311 and the fluorescent region 312 are formed inward the center from a circumference of the wavelength conversion wheel 310 to a predetermined width. It is desirable that the predetermined width is set in such a manner that the predetermined width includes a region BA in which the blue light has the likelihood of reaching the wavelength conversion wheel 310 within the light source unit.

A size of the reflective region 311 and a size of the fluorescent region 312 are determined by color coordinates of a fluorescent material that converts a different wavelength. That is, an angle of the segment depends on a value that is obtained by calculating the time the blue light takes to reach according to the color ordinates and the brightness of the fluorescent material.

The fluorescent region 312 is partitioned into multiple regions that are made of fluorescent materials with different colors that convert the wavelength of the blue light into different wavelength. For example, the fluorescent region 312 includes a red region 312R, a green region 312G, and a yellow region 312Y.

For example, an angle to which the reflective region 311 is formed is set to approximately 29 degrees, an angle to which the red region 312R is formed is set to approximately 63 degrees, an angle to which the green region G is formed is set to approximately 52, and an angle to which the yellow region 31Y is formed is set to approximately 36 degrees.

It is desirable that the green region 312G, the red region 312R, and the yellow region 312Y are sequentially arranged in order for the wavelength conversion wheel 310 to emit various colors over time. While the wavelength conversion wheel 310 rotates, the blue light is incident to any one of the green region 312G, the red region 312R, the yellow region 312Y, and the reflective region 311, and any one of the blue light, the green light, the red light, and the yellow light is generated.

However, according to the speed at which the wavelength conversion wheel 310 rotates, lights of multiple different colors are mixed and are emitted as a white light. The pencil of rays that is emitted as the white light passes through the fourth condensing lens 308 and the color wheel 309, and each color is realized and is emitted.

Formed in the color wheel are a blue B segment, a green G segment, a red R segment, and a yellow Y segment that correspond to the reflective region 311, the green region 312G, the red region 312R, and the yellow region 312Y, respectively. In addition, the wavelength conversion wheel 310 and the color wheel 309 are driven at substantially the same speed. In a case where the light forms a picture or an image by the wavelength conversion wheel 310 and the color wheel 309, a speckle phenomenon is prevented.

A fluorescent material is dispensed onto each of the green region 312G, the red region 312R, and the yellow region 312Y. That is, a mirror layer is formed on one surface of the metal disk in the wavelength conversion wheel 310. A fluorescent material in powder form that is mixed with an organic binder such as silicone is dispensed onto the mirror layer in order to form each fluorescent region 312.

In addition to the silicone resin, polymer or glass power may be used.

As the yellow wavelength conversion material, it is also possible to use YAG-based fluorescent materials such as $(Y_{1-x-y}Gd_xCe_y)_3Al_5O_{12}$, $(Y_{1-x}Ce_x)_3Al_5O_{12}$, $(Y_{1-x}Ce_x)_3(Al_{1-y}Ga_y)_5O_{12}$, $(Y_{1-x-y}Gd_xCe_y)3(Al_{1-z}Ga_z)_5O_{12}$, LuAG-based fluorescent materials such as $(Y_{1-x-y}Lu_xCe_y)_3Al_5O_{12}$, a silicate-based fluorescent such as $(Sr,Ca,Ba,Mg)_2SiO_4:Eu$, and an oxynitride-based fluorescent material such as $(Ca,Sr)Si_2N_2O_2:Eu$.

As the green wavelength conversion material, $Y_3(Al,Ga)_5O_{12}:Ce$, $CaSc_2O_4:Ce$, $Ca_3(Sc,Mg)_2Si_3O_{12}:Ce$, $(Sr,Ba)_2SiO_4:Eu,(Si,Al)_6(O,N)_8:Eu$ (β sialon), $(Ba,Sr)_3Si_6O_{12}N_2:Eu$, $SrGa_2S_4:Eu$, and $BaMgAl_{10}O_{17}:Eu,Mn$ are desirable. It is further desirable that LuAG-based fluorescent material such as $(Y_{1-x-y}Lu_xCe_y)_3Al_5O_{12}$ is used.

As the red wavelength conversion material, it is possible to use $(Ca,Sr,Ba)_2Si_5(N,O)_8:Eu$, $(Ca,Sr,Ba)Si(N,O)_2:Eu$, $(Ca,Sr,Ba)AlSi(N,O)_8:Eu$, $(Sr,Ba)_3SiO_5:Eu$, $(Ca,Sr)S:Eu$, $(La,Y)_2O_2S:Eu$, $K_2SiF_6:Mn$, and $CaAlSiN:Eu$.

However, the wavelength conversion materials are not limited to these fluorescent materials, and various fluorescent materials may be used. Light in each wavelength band is reflected by the wavelength conversion materials describe above.

On the other hand, the fluorescent region 312 may be formed in the form of an optoceramic instead of mixed silicone resin. The optoceramic, as a fluorescent film in a bulk form, may be bonded directly on the mirror. The optoceramic material is one that is mixed with an inorganic or organic pigment that absorbs or reflects (transmits) a light in a specific wavelength band, of which a wavelength is changed by a fluorescent material.

The optoceramic is made of a ceramic material. The optoceramic itself is conveniently bonded directly to the wheel. When the optoceramic is used thermal stability is improved compared to organic silicone resin.

As the optoceramic material, is possible to basically use YAG-based materials such as $(Y_{1-x-y}Gd_xCe_y)_3Al_5O_{12}$, $(Y_{1-x}CeO_3Al_5O_{12})$, $(Y_{1-x}CeO_3(Al_{1-y}Ga_y)_5O_{12})$, and $(Y_{1-x-y}Gd_xCe_y)_3(Al_{1-z}Ga_z)_5O_{12}$, LuAG-based materials such as $(Y_{1-x-y}Lu_xCe_y)_3Al_5O_{12}$, and $Y_3(Al,Ga)_5O_{12}:Ce,(Si,Al)_6(O,N)_8:Eu$ (β sialon).

According to a type of mold that is provided, the optoceramic material is formed into various shapes such as a fan and a disc. The optoceramic material can be processed to a thickness of 0.2 t.

Figure 7:
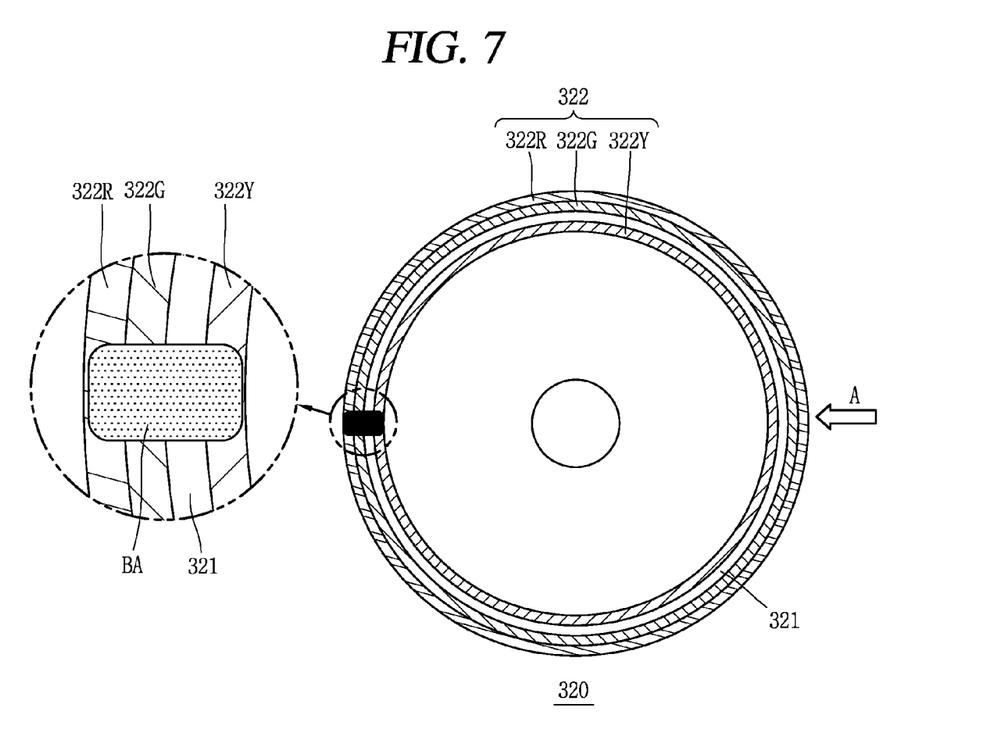
FIG. 7 is a diagram of a wavelength conversion wheel according to another embodiment.

FIG. 7 is a diagram illustrating a wavelength conversion wheel according to another embodiment.

Referring to FIG. 7, a wavelength conversion wheel 320 is configured in such a manner as to simultaneously emit lights of multiple colors. The wavelength conversion wheel 320 includes a reflective region 321 and a fluorescent region 322, each of which has the shape of a close loop ring. The wavelength conversion wheel 320 according to the present embodiment has substantially the same features as does the wavelength conversion wheel 310 except for shapes and arrangement constructions of the reflective region 321 and the fluorescent region 322. According, the description that is provided referring to FIG. 6 is referred to for a description that is omitted due to redundancy.

The wavelength conversion wheel 320 is configured to have the shape of a plate, and includes the reflective region 321 and the fluorescent region including a red region 322R, a green region 322G, and a yellow region 322Y. The reflective region 321 and the fluorescent region 322 are formed inward toward the center of the plate from a circumference of the plate to a predetermined width. It is desirable that the predetermined width is set in such a manner that the predetermined width includes the region BA that the blue light reaches.

The red region 322R is formed along a circumference of the plate and has the shape of a closed curve. The red region 322R is formed to a predetermined width. The green region 322G is formed in the shape of a closed loop along a circumference of the red region 322R. Likewise, the reflective region 321 and the yellow region 322Y are formed in the shape of a closed loop. For example, each region is formed in the shape of a ring or a band.

The regions are formed in such a manner as to have substantially the same width, but are not limited to the same width. The regions may have different widths according to the region BA that the blue light reaches and the circumference of the plate.

The blue light is incident on the reflective region 321, the red region 322R, the green region 322G and the yellow region 322Y at the same time. Therefore, when the blue light reaches the wavelength conversion wheel 320, a blue light, a green light, a red light, and a yellow light are simultaneously reflected and thus a white light is emitted.

While the wavelength conversion wheel 320 according to the present embodiment rotates, lights of multiple colors are emitted at a time, and efficiency in the emittance of a pencil of lays is improved.

Figure 8A:
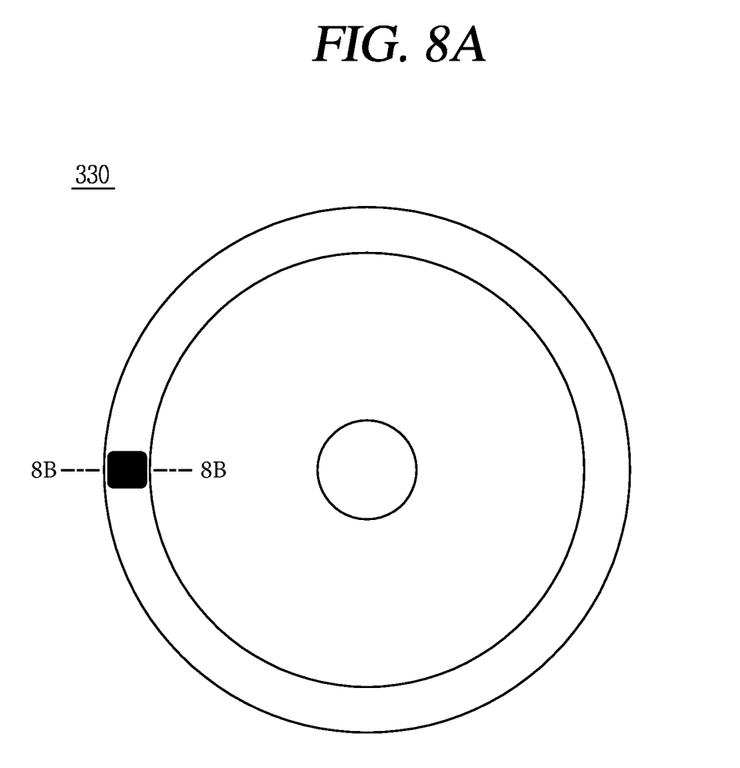
FIGS. 8A to 8C are diagrams for describing a wavelength conversion wheel according to another embodiment.
Figure 8B:
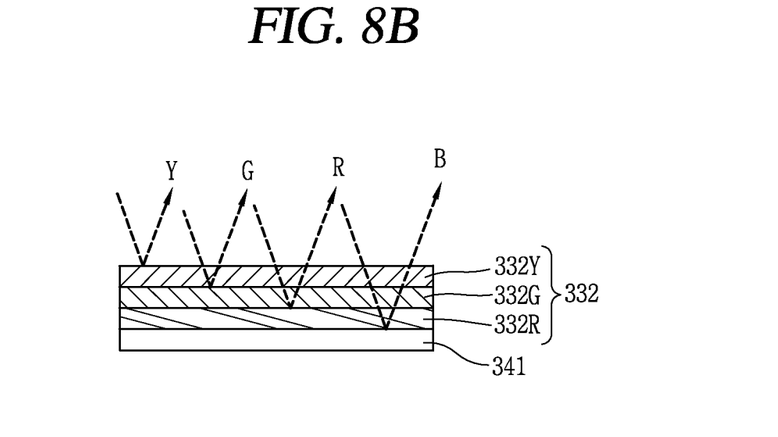
Figure 8C:
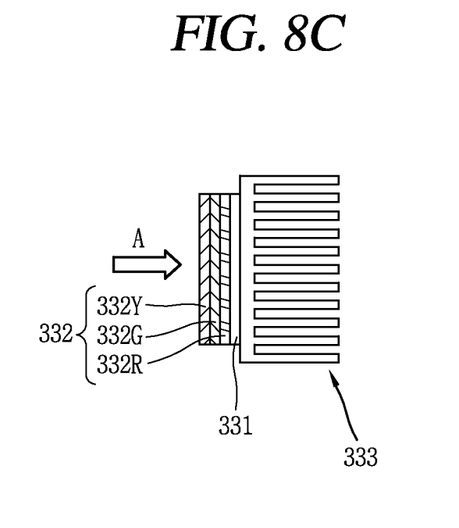

FIGS. 8A to 8C are diagrams for describing a wavelength conversion wheel 330 according to another embodiment. FIG. 8A is a diagram of the wavelength conversion wheel 330. FIG. 8B is a cross-sectional diagram of the wavelength conversion wheel 330 taken along line 8B-8B on FIG. 8A. The wavelength conversion wheel 330 according to the present invention is formed in such a manner that a reflective layer 331 and a fluorescent layer 332 are superimposed onto each other in an incident direction of the blue light. Thus, the blue light is reflected by each layer, thereby having different colors.

That is, as illustrated in FIG. 8B, a red fluorescent layer 332R is formed on the reflective layer 331 that reflects light, a green fluorescent layer 332G is formed on the red fluorescent layer 332R, and yellow fluorescent layer 332Y is formed on the green fluorescent layer 332G. The reflective layer 331 and the fluorescent layer 332 are formed along the circumference of the plate in such a manner as to have the shape of a closed loop. In addition, it is desirable that the reflective layer 331 and the fluorescent layer 332 are formed to have predetermined widths in such a manner that the reflective layer 331 and the fluorescent layer 332 includes the region BA on which a blue light is incident.

The blue light is incident on the wavelength conversion wheel 330, and a yellow light of which a wavelength is converted by a fluorescent material included in the yellow fluorescent layer 332Y is reflected to the outside of the wavelength conversion wheel 330. In the same manner, the green fluorescent layer 332G and the red fluorescent layer 332R converts the wavelength of the blue light and then reflects the green and red light. In addition, the blue light of which the wavelength is not converted by the fluorescent layer 332 is reflected by the reflective layer 331. Accordingly, the blue light, the green light, the red light, and the yellow light are emitted from the region BA on which the blue light is incident and are provided as the white light. Accordingly, efficiency in the emittance of light is improved.

FIG. 8C is a diagram for describing the wavelength conversion wheel on which a heat sink is mounted. Referring to FIG. 8C, a heat sink 333 is arranged on the back side of the reflective layer 331. The heat sink 333 is made of a metal material.

On the other hand, the heat sink is made of the same material as that of the reflective layer 331, and the reflective layer 331 and the heat sink are integrated into one piece.

That is, the fluorescent layer 332 is formed on one surface of the reflective layer 331, and the heat sink 333 that includes at least one protrusion for dissipating heat is formed on the other surface of the reflective layer 331.

According to the present embodiment, one surface of the wavelength conversion wheel is made of a metal material, and thus the heat sink is simply formed without going through a separate process of manufacturing the heat sink.

Figure 9A:
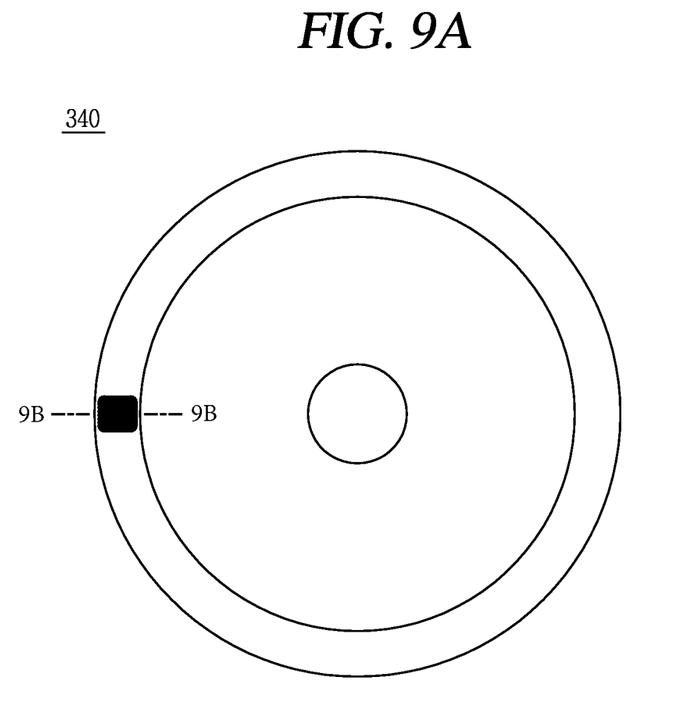
FIGS. 9A and 9B are diagrams for describing a wavelength according to another embodiment.
Figure 9B:
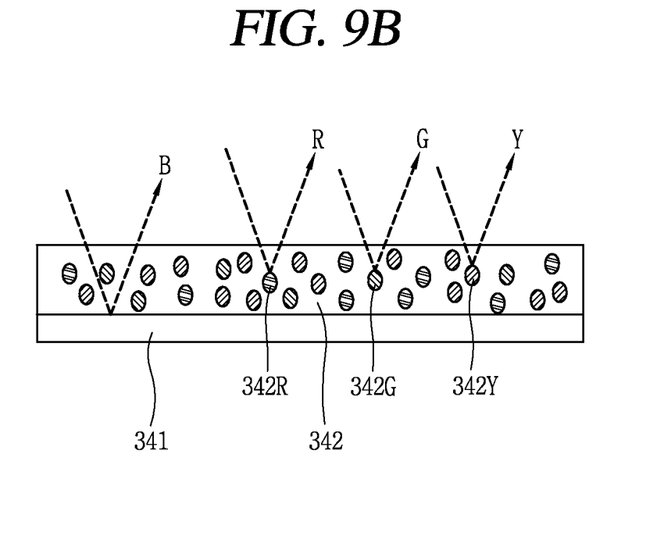

FIGS. 9A to 9B are diagrams for describing a wavelength conversion wheel according to another embodiment. FIG. 9A is a diagram of the wavelength conversion wheel. FIG. 9B is a cross-sectional diagram of the wavelength conversion wheel taken along line 9B-9B on FIG. 9A.

A wavelength conversion wheel 340 includes a reflective layer 341 and a fluorescent layer 342. The fluorescent layer 342 includes at least one material. For example, the fluorescent layer 342 includes a red fluorescent material 342 R, a green fluorescent material 342G, and a yellow fluorescent material 342Y.

That is, the reflective layer 341 and the fluorescent layer 342 are combined into at least one layer. When the blue light is incident on each fluorescent material, the wavelength of the blue light is converted and is reflected.

The light source unit according to the present invention is mounted not only on the image projection device and but also on a lighting apparatus. For example, in a case where the light source unit is mounted in the lighting apparatus that, over time, emits a blue light, a green light, a red light, and yellow light, as substantially the same color, a white light, a configuration of the color wheel is omitted. When the light source unit is installed in a narrow space, illumination with an improved lighting efficiency can be realized.

The configuration and the method relating to the light source unit, and the image projection device and the lighting apparatus that include the light source unit, described above according to the embodiments, are not applied in a limited manner, but all of or some of the embodiments may be selectively combined with each other to create various modifications to the embodiments.

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A light source unit comprising:
    a light source configured to emit a pencil of blue lights in a first direction;
    a polarizer configured to selectively transmit a specific polarization light in the pencil of blue lights and to reflect a remaining light of the pencil of blue lights;
    a phase retarder configured to transmit the specific polarization light transmitted by the polarizer and retard a phase of the specific polarization light to thereby produce a first phase-retarded light; and
    a wavelength conversion wheel configured to receive the first phase-retarded light, convert a wavelength of the first phase-retarded light, and reflect a resulting wavelength-converted first phase-retarded light in a direction opposite to the first direction toward the phase retarder,
    wherein the phase retarder is configured to retard a phase of the wavelength-converted first phase-retarded light to thereby produce a second phase-retarded light, and
    wherein the wavelength conversion wheel includes:
        a circle-shaped base made of a metal material to reflect light;
        a fluorescent region that converts the wavelength of the first phase-retarded light; and
        a reflective region that reflects the first phase-retarded light without changing the wavelength of the first phase-retarded light,
        wherein the reflective region has a shape of a closed loop along an edge portion of the base, and
        wherein the fluorescent region has a first ring shape as a red region, a second ring shape disposed on an inner space of the first ring as a green region and a third ring shape disposed on an inner space of the second ring as a yellow region.

2. The light source unit of claim 1, wherein the polarizer comprises a polarization beam splitting film configured to transmit a P wave blue light in the pencil of blue lights.

3. The light source unit of claim 2, wherein the second phase-retarded light is an S wave light.

4. The light source unit of claim 3, wherein the phase retarder retards a phase of the P wave blue light by λ/4.

5. The light source unit of claim 1, wherein the polarizer is arranged at a predetermined angle with respect to the first direction so that the second phase-retarded light is reflected by the polarizer and propagates in a second direction intersecting the first direction.

6. The light source unit of claim 1, wherein the wavelength conversion wheel is arranged to intersect the first direction and to rotate about the first direction.

7. The light source unit of claim 6,
wherein the reflective region is located on one surface of the base to a predetermined width.

8. The light source unit of claim 7, wherein the wavelength conversion wheel further includes a heat sink protruding from an other surface of the base in order to dissipate heat.

9. The light source unit of claim 7, wherein the fluorescent region is located on one surface of the base along an edge portion of the base to a predetermined width.

10. The light source unit of claim 1, further comprising:
a color wheel partitioned into segments with multiple colors and configured to rotate about a center of the color wheel in such a manner that the pencil of rays reflected by the polarizer is incident on the color wheel and is light-split into the multiple colors, and
wherein the color wheel is configured to be driven in such a manner that a rotation speed of the color wheel is the same as a rotation speed of the wavelength conversion wheel.

11. The light source unit of claim 1, wherein the reflective region is located between the green region and the yellow region.

12. An image projection apparatus comprising:
a body that makes up an external appearance;
a light source unit arranged within the body and that emits a pencil of rays; and
an image formation unit configured form an image using the pencil of rays,
wherein the light source unit includes:
a light source configured to emit a pencil of blue lights in a first direction;
a polarizer configured to selectively transmit a specific polarization light in the pencil of blue lights and to reflect a remaining light of the pencil of blue lights;
a phase retarder configured to transmit the specific polarization light transmitted by the polarizer and retard a phase of the specific polarization light to thereby produce a first phase-retarded light; and
a wavelength conversion wheel configured to receive the first phase-retarded light, convert a wavelength of the first phase-retarded light, and reflect a resulting wavelength-converted first phase-retarded light in a direction opposite to the first direction toward the phase retarder,
wherein the phase retarder is configured to retard a phase of the wavelength-converted first phase-retarded light to thereby produce a second phase-retarded light, and
wherein the wavelength conversion wheel includes:
a circle-shaped base made of a metal material to reflect light;
a fluorescent region that converts the wavelength of the first phase-retarded light; and
a reflective region that reflects the first phase-retarded light without changing the wavelength of the first phase-retarded light,
wherein the reflective region has a shape of a closed loop along an edge portion of the base, and
wherein the fluorescent region has a first ring shape as a red region, a second ring shape disposed on an inner space of the first ring as a green region and a third ring shape disposed on an inner space of the second ring as a yellow region.

13. The image projection apparatus of claim 12, wherein the polarizer comprises a polarization beam splitting film configured to transmit a P wave blue light in the pencil of blue lights,
wherein the second phase-retarded light is an S wave light, and
wherein the phase retarder retards a phase of the P wave blue light by λ/4.

14. The image projection apparatus of claim 12, wherein the polarizer is arranged at a predetermined angle with respect to the first direction so that the second phase-retarded light is reflected by the polarizer and propagates in a second direction intersecting the first direction.

15. The image projection apparatus of claim 12, wherein the wavelength conversion wheel is arranged to intersect the first direction and to rotate about the first direction.

16. The image projection apparatus of claim 15,
wherein the reflective region is located on one surface of the base to a predetermined width.

17. The image projection apparatus of claim 16, wherein the wavelength conversion wheel further includes a heat sink protruding from an other surface of the base in order to dissipate heat.

18. The image projection apparatus of claim 16, wherein the fluorescent region is located on one surface of the base along an edge portion of the base to a predetermined width.

19. The image projection apparatus of claim 12, further comprising:
a color wheel partitioned into segments with multiple colors and configured to rotate about a center of the color wheel in such a manner that the pencil of rays reflected by the polarizer is incident on the color wheel and is light-split into the multiple colors,
wherein the color wheel is configured to be driven in such a manner that a rotation speed of the color wheel is the same as a rotation speed of the wavelength conversion wheel.

20. The image projection apparatus of claim 12, wherein the reflective region is located between the green region and the yellow region.

* * * * *